United States Patent [19]

Wilhelm

[11] 4,327,707

[45] May 4, 1982

[54] SOLAR COLLECTOR

[75] Inventor: William G. Wilhelm, Cutchogue, N.Y.

[73] Assignee: The United States of America as represented by the United States Department of Energy, Washington, D.C.

[21] Appl. No.: 96,260

[22] Filed: Nov. 20, 1979

[51] Int. Cl.$^3$ ............................................. F24J 3/02
[52] U.S. Cl. .................................. 126/426; 126/444; 126/450
[58] Field of Search ............... 126/450, 444, 449, 426, 126/445, 901, 418

[56] References Cited

U.S. PATENT DOCUMENTS

| | | | |
|---|---|---|---|
| 1,886,620 | 11/1932 | Atkinson | 126/271 |
| 1,889,238 | 11/1932 | Clark | 126/271 |
| 2,208,789 | 7/1940 | Cally | 126/271 |
| 3,145,707 | 8/1964 | Thomason | 126/271 |
| 3,236,294 | 2/1966 | Thomason | 126/271 |
| 3,254,643 | 6/1966 | Thomason | 126/271 |
| 3,897,820 | 8/1975 | Teeter | 126/271 |
| 3,918,430 | 11/1975 | Stout | 126/271 |
| 3,974,822 | 8/1976 | Patil | 126/271 |
| 3,986,491 | 10/1976 | O'Hanlon | 126/271 |
| 3,989,031 | 11/1976 | Thomason | 126/450 |
| 4,010,733 | 3/1977 | Moore | 126/450 |
| 4,026,268 | 5/1977 | Bartos et al. | 126/271 |
| 4,055,163 | 10/1977 | Costello et al. | 126/450 X |
| 4,059,094 | 11/1977 | de Mendoza | 126/271 |
| 4,252,109 | 2/1981 | Newton | 126/450 |

FOREIGN PATENT DOCUMENTS 2603811  7/1977  Fed. Rep. of Germany ...... 126/432

OTHER PUBLICATIONS

"Dev. of a Low-Cost Solar Panel Using Laminated Polymer Films", E. V. Nelson et al., Jan. '79, Dept. of Energy Report under Contract #EG-77-C-04-4121.

Primary Examiner—Samuel Scott
Assistant Examiner—G. Anderson
Attorney, Agent, or Firm—Cornell D. Cornish; Richard G. Besha; James E. Denny

[57] ABSTRACT

The field of this invention is solar collectors, and more particularly, the invention pertains to a flat plate collector that employs high performance thin films. The solar collector of this invention overcomes several problems in this field, such as excessive hardware, cost and reliability, and other prior art drawbacks outlined in the specification. In the preferred form, the apparatus features a substantially rigid planar frame (14). A thin film window (42) is bonded to one planar side of the frame. An absorber (24) of laminate construction is comprised of two thin film layers (24a, 24b) that are sealed perimetrically. The layers (24a, 24b) define a fluid-tight planar envelope (24c) of large surface area to volume through which a heat transfer fluid flows. Absorber (24) is bonded to the other planar side of the frame. The thin film construction of the absorber assures substantially full envelope wetting and thus good efficiency. The window and absorber films stress the frame adding to the overall strength of the collector.

9 Claims, 16 Drawing Figures

SOLAR COLLECTOR

The invention was made or conceived in the course of, or under a contract with, the U.S. Department of Energy.

BACKGROUND OF THE INVENTION

This invention relates to a solar collector, and more particularly, to a flat plate energy absorber that uses thin films and is of simplified design.

There are a myriad of solar energy absorbers or collectors available. Generally, absorbers heretofore tend to be complicated and labor intensive. The simpliest of these systems employ involved plumbing schemes and absorber hardware that make even the "low cost" versions relatively expensive. Then, too, the overly complicated nature of prior apparatus comprises system reliability and detracts from system efficiency.

The present invention departs from standard practice and utilizes high performance, low cost thin films for the window of the collector and for the absorber. The thin films are bonded to the collector, or panel, in a stressed state and thus add to the overall strength of the panel. In general, the present invention comprises a rigid perimetric planar frame of light weight construction. A thin film, high strength plastic window or glazing is stretched across and bonded to one planar side of the frame. A thin film absorber, of laminate construction, defines a fluid-tight planar envelope through which a heat transfer fluid flows. The absorber is stretched across and bonded to the other planar side of the frame. The frame is thus stressed by the thin films on both planar sides yielding a panel of light weight monocoque construction that exhibits high strength. In the preferred structure, the absorber comprises two thin films that are perimetrically sealed. Means, in the form of a plurality of spot-welds or spot-bonds, are applied across the planar face of the absorber laminate for dimensional stability. By means of simplified input and output piping, the heat transfer fluid is admitted to and extracted from the absorber. In the preferred structure, the rigid members that comprise the frame are each, in transverse cross-section, defined by opposed, outwardly directed perimetric parallel flats. These flats provide a planar perimetric surface onto which the glazing and absorber bond. For added capacity, individual panels are readily joined in planar array by such means as contact bonding of adjacent planar perimetric flats. When the panels are so joined, the individual strength of a given panel enhances the overall strength of the array. The structural configuration of the frame readily accomodates the relative thermal expansion and contraction of adjacent panels thus minimizing structural fatigue.

It is, therefore, a object of the present invention to provide a low cost solar collector that is of simplified design.

It is another object of the present invention to provide a light weight, flat plate solar collector having a high degree of structural rigidity.

It is a further object of the present invention to provide a solar collector having a low cost, high strength absorber having good heat transfer to the fluid flowing through it.

It is still a further object of the present invention to provide a flat plate solar collector that is readily ganged in an ensemble or array of such collectors for added capacity, and wherein the strength of a given collector of the array adds to the strength of the other collectors of the array.

It is another object of the present invention to provide a low cost, light weight solar collector that eliminates the need for expensive fittings and other assembly hardware.

It is a still further object of the present invention to provide a solar collector of simplified design wherein the input and output piping forms a structure of integrated design with the collector.

It is one more object of the present invention to provide a low cost solar collector that can be installed on existing planar surfaces, such as roofs, with a minimum of labor, and that is capable of using such existing surfaces as backing insulation.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

BRIEF DESCRIPTION OF THE DRAWINGS

In the drawings, wherein the same reference numeral denotes the same element throughout the several views.

DETAILED DESCRIPTION OF THE INVENTION

More particularly now and referring to the drawings, FIGS. 1 through 9 show the flat plate, thin film solar collector of the present invention with same being indicated generally by reference numeral 10. The collector is defined by a substantially planar rigid perimetric frame 14, that, in plan view, is preferably rectangular. Frame 14 is comprised of spaced parallel confronting side members 14a and 14b, and 14c and 14d. As seen best in FIG. 1, each member 14a, 14b, 14c, and 14d is, in transverse cross-section, U-channeled or U-shaped and, as such, is defined by respective outwardly projecting parallel spaced flats or flanges 16 and 18. Frame 14 can be fabricated from either light-gauge metal, such as galvanized steel or aluminum, or the frame can be comprised of plastic or nylon, or some such synthetic. Indeed, frame 14 might be fabricated from wood or hardboard stock, or the frame can be fabricated from a composite of these materials such as plastic and metal. In actual construction, frame 14 can be bent into its preferably rectangular shape from single stock, or, the frame can be fabricated from discrete members bonded or jointed into this rectangular configuration.

Figure 1:
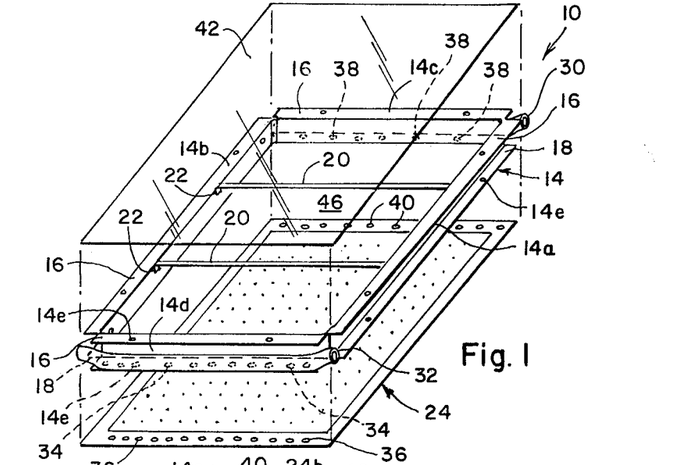
FIG. 1 is an exploded perspective view of a solar collector according to the present invention showing the planar construction of the thin film glazing and thin film absorber.
Figure 6:
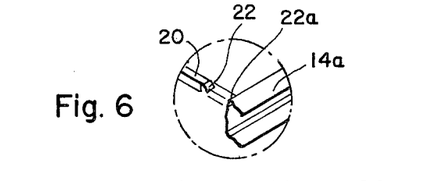
FIG. 6 is a fragmentary perspective view drawn on an enlarged scale showing that portion indicated as 6 in FIG. 5 to reveal in detail a cross-piece added to the frame for rigidity.

For added rigidity, frame 14 is braced with one or a plurality of cross-pieces 20. Each cross-piece 20 includes a frame-fitting locking tang 22 that fits into a complementary receiving slot 22a in frame sides 14a and 14b. And, to facilitate on-site mounting of the collector, frame 14 includes a plurality of mounting holes 14e disposed through flats 16 and 18.

A thin film absorber 24 is sized complementary to the included planar area presented by the perimeter of frame 14, or, more precisely, flats 18. Absorber 24 is of laminate construction and as such is comprised of thin film planar layers 24a and 24b each having a nominal thickness of 0.003 inches (0.01 cm). Each thin film layer 24a and 24b is, preferably, fabricated from thin film plastic stock such as polypropylene, polyfluoride, or polyester, and, therefore, is capable of withstanding temperatures of up to 400° F. under stagnant conditions. In certain applications, and for increased efficiency, absorber 24 can be comprised of a laminate of thin films that further enhance thermodynamic efficiency. For example, enhanced operation can be obtained by fabricating absorber layer 24b, the layer that immediately faces the sun, from high performance polypropylene or polyester owing to this material's improved ultraviolet absorptivity. Absorber layer 24a can be fabricated from polyester, owing to this material's desired strength.

Another high performance material, polytetrafluoroethylene (known under the Trademark Teflon) may be used in absorber 24 if coated so as to increase absorptivity. Preferably such coating would be selective, i.e. having good absorptivity in the visual region of the spectrum while having low emissivity in the infra-red region. The use of polytetrafluoroethylene may allow stagnation temperatures as high as about 400° F.

Then, too, under stagnant worst case conditions, the absorber temperature can rise prohibitively. To combat these extreme temperature excursions, high performance plastic films can be employed for absorber layer 24b that will change opacity in response to temperature, or light intensity, or both, thereby "shutting down" the apparatus, so to speak, or reducing solar absorptivity during these extreme worst case excursions.

The perimetric planar edges of thin film layer 24a and 24b are bonded together to form a water-tight planar envelope 24c. And, as seen best in FIGS. 2 and 7, a plurality of dimples or spot-bonds 26 are preferably placed across the planar face of absorber 24 in what amounts to a "patch quilt" configuration. Spot-bonds or dimples 26 provide a means for maintaining the dimensional stability of absorber 24 and thus define a plurality of localized point-regions where layers 24a and 24b joint mechanically or fuse. With this construction, envelope 24c defines an essentially planar flowpath between the opposed closely spaced surfaces of layers 24a and 24b that exhibits good dimensional stability under flow conditions. (Alternatively layers 24a and 24b may be bonded linearly so as to form channels.) An adhesive 28, such as A-10 Isotac acrylic pressure sensitive adhesive, is applied to the outboard surface of perimetric flats 16 that comprise one side or planar face of frame 14. Absorber 24, sized complementary to this planar face or perimeter, is then stretched taut and applied or pressed against adhesively coated flats 16 bounding the absorber to this one side of frame 14, as shown. Other bonding geometries, such as bonding films 24a and 24b to flats 16 under high-tension without the above mentioned bonds, are possible so long as they are capable of maintaining a high degree of parallelism between films 24a and 24b as fluid flows between them.

The critical aspect of designing absorber 24 is achieving minimum restriction of flow with a maximum of effective heat transfer surface. One way to assure this requires that films 24a and 24b be wetted over their full area. Preferably such full wetting is achieved by introducing the fluid at the top of collector 10 and allowing it to flow down through collector 24 under only the influence of gravity. This mode of operation will minimize the stresses on absorber 24 and will provide substantially full wetting when absorber 24 is formed by films having a nominal thickness of from 0.001 to 0.003 inches and assembled, as described above, so as to assure a high degree of parallelism between films 24a and 24b when fluid flows between them.

Alternatively full wetting may be achieved by pumping fluid in at the bottom of collector 10. Using this mode of operation full wetting may be achieved even if somewhat thicker films are used to form absorber 24.

However, then the surface must be able to tolerate static water pressure possibly equivalent to 10 ft of gravity head pressure. The dimpled envelope construction may meet this requirement provided the bonds are sufficiently strong and/or closely spaced. Ultrasonic welding of spot-bonds 26 should provide the needed strength.

Another, preferred, alternative, for the absorber is to use aluminum/plastic (e.g. polyester or polytetrafluoroethylene) laminate films for either the upper layer 24b or for both layers 24a and 24b of absorber 24. Such aluminum would, of course, be given a highly absorbtive and preferably selective absorbtive coating. the high heat transfer capacity of the aluminum would have the advantage of making full wetting of absorber 24 less crucial.

Means for manufacturing coated, aluminum/plastic laminates are well known in the plastics industry; such materials having been used, for example, in packaging.

Figure 5:
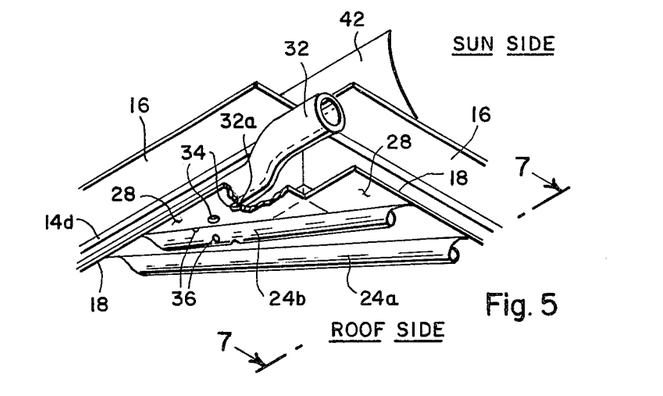
FIG. 5 is a fragmentary perspective view drawn on an enlarged scale showing that portion indicated as 5 in FIG. 2 to reveal in detail the laminate construction of the thin film abosrber, the thin film structure of the glazing, and the construction of the outlet manifolding.

An inlet manifold 30, and an outlet manifold 32 are placed at respective ends of frame 14, correspondingly, to provide an input and output path for the heat transfer fluid.

The material comprising the input and output manifolds should exhibit resistance to corrosion and compatability with thermal bonding techniques. Candidates for such a material include variations on polyvinylchloride, and stainless steel. As shown, inlet manifold 30 is disposed in the channel provided by frame member 14c, and outlet manifold 32 is disposed in the channel provided by complementary frame member 14d. Outlet manifold 32 is bonded to and thus rigidly fixed on the underside of flat 18. A plurality of apertures 34 are disposed in and through flat 18. A plurality of apertures 32b are disposed in outlet manifold 32. And, a plurality of output apertures 36 are disposed in absorber layer 24b and thus communicate with envelope 24c of absorber 24. It will be apparent that the respective apertures 32b in output manifold 32, the apertures 34 in perimetric flat 18, and the output apertures 36 of absorber layer 24b are in dimensional registration or align along a common axis to thereby allow the heat transfer fluid to egress the apparatus during operation of the invention as will be described below. Typically, the apertures just described for the egress of the heat transfer fluid are approximately 0.64 cm in diameter and they are placed on approximately 1.3 cm centers across flat 18 of member 14d.

In a manner similar to that described for outlet manifold 32, inlet manifold 30 is disposed in frame channel 14c. Inlet manifold 30 is likewise bonded to the underside of its respective flat 18. A plurality of apertures 30a are disposed in input manifold 30. A plurality of apertures 38 are disposed in and through flat 18 of frame member 14c. And, a plurality of input apertures 40 are disposed in absorber layer 24b and thus communicate with planar envelope 24c. It will be apparent, too, that the apertures 30a of manifold 30, the apertures 36 of frame member 14c, and the input apertures 40 of absorber layer 24b are in dimensional registration such that the heat transfer fluid pumped into manifold 30 flows into the interior or absorber envelope 24c during operation of the invention as will be described shortly. Apertures 30a, 38 and 40 are typically approximately 0.6 to 0.7 mm in diameter, and generally may be much smaller than output apertures.

A thin film plastic glazing or window 42 is stretched taut and bonded to the other planar side of frame 14, that is, the planar side or face presented by flats 16. To accomplish this, an adhesive 44, similar to adhesive 28, is applied to the outboard planar face or surface presented by flats 16. Thin film glazing 42 is then placed in pressure engagement against adhesively coated flats 16 thereby perimetrically bonding the glazing to the frame. Glazing 42 is preferably comprised of a single thin film of plastic selected for its good radiative transmissibility and strength. Candidates for material comprising glazing 42 include ultraviolet stabilized polyesters having film thicknesses of from 0.004 to 0.011 inches (0.01 to 0.28 cm). For improved performance and weatherability, it might be desirable to include an anti-reflection surface on the outboard face of glazing 42, as well as adding anti-oxidants and anti-static agents to the glazing. The ant-static agents act to reduce accumulation of dust and debris on the surface of the film, and the anti-reflection feature of the glazing acts to increase the amount of solar energy admitted into the collector. Then, too, glazing 42 can be comprised of a material that will change opacity and thus radiative transmissibility during stagnant worst case temperature excursions. This kind of advanced window, working with a similarly constructed advanced absorber, acts to prevent a kind of thermal runaway and weakening of the collector during these worst case excursions. Perimetrically bonded glazing 42, in conjunction with perimetrically bonded absorber 24, enclose a substantially sealed or dead air space 46 within frame 14.

Figures 7, 8:
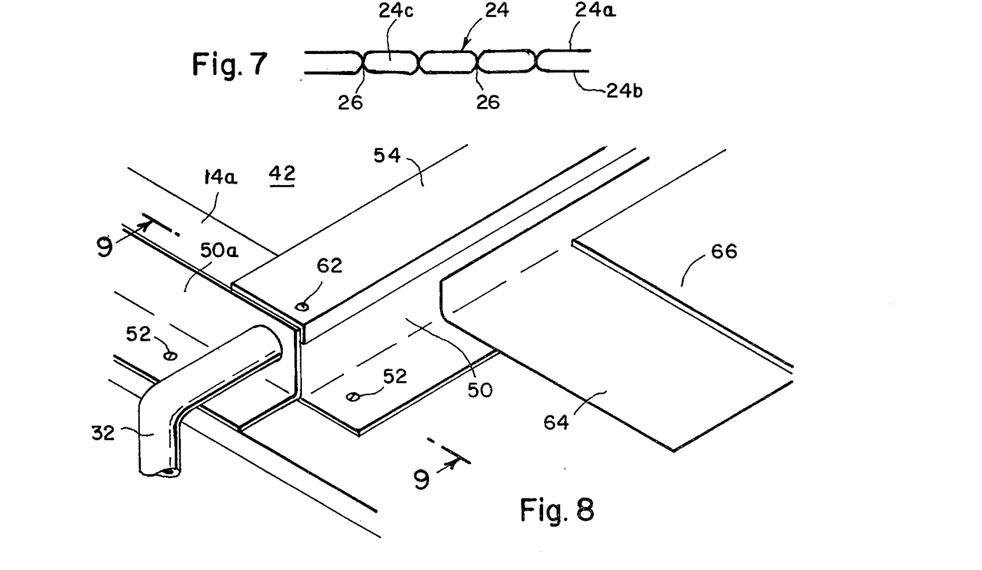
FIG. 7 is an exaggerated sectional view taken on line 7—7 of FIG. 5 and looking in direction of the arrows to reveal the laminate construction of the absorber, and showing the spot-bonds with the separation between films, caused by the passage of fluid, shown greatly exaggerated, across the planar face thereof.
FIG. 8 is an enlarged fragmentary perspective view showing perimeter support structure for the collector and the manner of mounting the collector on a roof.
Figure 9:
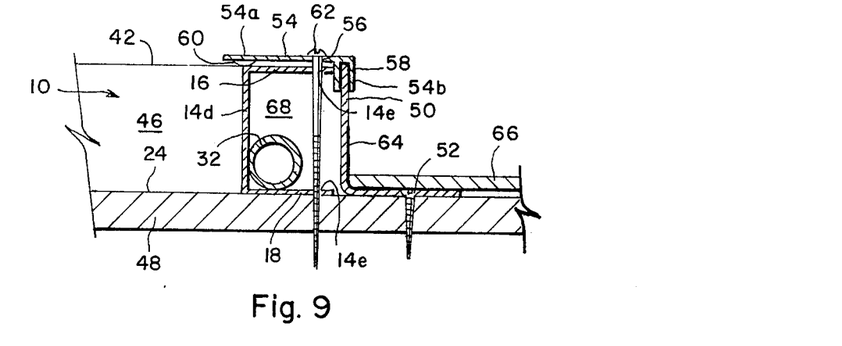
FIG. 9 is a side elevational view taken along the line 9—9 of FIG. 8 and looking in the direction of the arrows.

The collector typically is placed against an existing insulating planar surface 48, with glazing 42 face-up or facing the sun. Collector 10 can be attached to surface 48 by conventional means. Alternatively, an L-bracket 50, coextensive with the length and height of complementary frame members 14c and 14d is fastened to surface 48 by means of a plurality of fastening elements 52. A support bracket 54 having operatively placed apertures 56, is on one end, defined by a planar land 54a, and on the other end, defined by a mini U-channel 54b, as shown. Collector 10, or more precisely, frame member 14d is oriented so as to confront the upwardly extending inboard planar surface of bracket 50. A soft seal strip 58 is disposed along the outboard surface of glazing 42, and positioned thereon immediately over a portion of flat 16. And, a soft seal strip 60 is placed over the upwardly extending planar edge of L-bracket 50. Support bracket 54 is then placed over flat 16 such that mini U-channel 54b engages the exposed upwardly extending seal-covered planar edge of L-bracket 50, while at the same time causing planar land 54a to engage seal 58. An elongate fastening member 62 is received in axially aligned apertures 56 and 14e. Member 62 drives bracket 54 firmly onto seals 58 and 60 compressing the same to thereby effect a relatively tight seal about the open end of member 14d. In addition, member 62 secures frame 14 onto surface 48. In like manner, although not shown separately, the open end of frame member 14c, carrying input pipe 30, is sealed and secured to surface 48.

The structure of L-bracket 50 readily lends itself to collector installation on a roof. If the collector is to be mounted on a roof, a layer of flashing 64 can be applied to and thus butt up against the outboard surface of bracket 50. Shingles 66 can then be applied as shown. For added efficiency, an insulating material 68, such as figerglass or foam, can be interposed within the U-channel of each frame member 14c and 14d. Moreover, in certain applications it might be desirable to insulate or seal the U-channels of each frame member 14a and 14b from gross ambient temperature fluxuations. To accomplish this, correspondingly sized L-brackets 50a can be positioned against the outwardly projecting edges of flats 16 and 18 of the last-mentioned frame members to likewise seal their respective U-channels.

Enhanced operation may be obtained by insulating the U-channels that carry the input and output piping.

In operation and use, frame 14, or more particularly, glazing 42 is disposed so as to face the sun. Water, or other suitable heat transfer fluid, is pumped into inlet manifold 30 and thus flows into planar envelope 24c defined by thin film planar layers 24a and 24b. Owing to the unique construction of thin-film absorber 24, a particular orientation of inlet manifold 30 relative to outlet manifold 32 is not essential. That is, inlet manifold 30 can be above, below, or level with, outlet manifold 32 because, as the heat transfer fluid flows through envelope 24c, the method of assembly and thinness of film layers 24a and 24b assures substantially full wetting of same even without pressurization of the fluid within envelope 24c. However, as described above a gravity (trickle) fed mode is preferred. As the heat transfer fluid passes through absorber envelope 24c, it is heated therein eventually to be collected in outlet manifold 32 for distribution.

Owing to the relatively large surface area present by the thin film planar faces of collector 10, the wind loading on the collector and frame can reach high levels. This tends to distort the glazing with possible enhancement of material failure. Cross-struts 20 reduce this tendency by adding to the overall rigidity of frame 14 and reducing the surface to bonding area ratio. Moreover, as noted above, both glazing 42 and absorber 24 are applied to respective sides of frame 14 in a stressed state. This perimetric "skin tight" or monocoque construction also adds to the overall strength of the collector.

Figure 10:
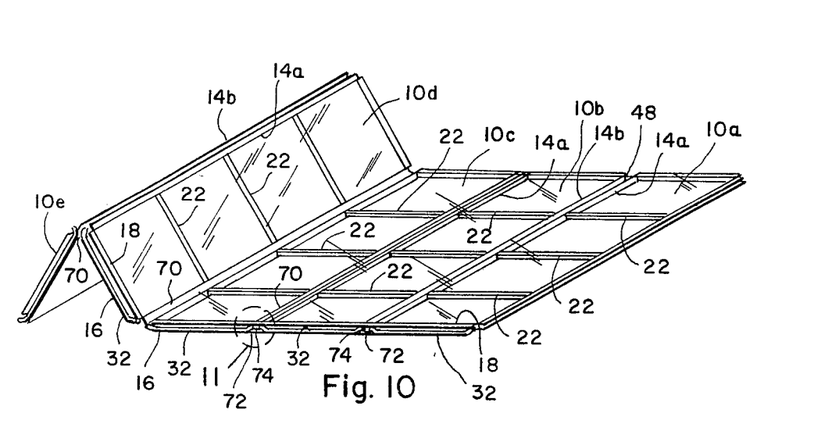
FIG. 10 is a perspective view of a hinged, five panel array of solar collectors according to the present invention, the array is seen being assembled, three of the panels have been placed in an operative planar configuration and they are in fluid communication by means of O-ring couplings.
Figure 11:
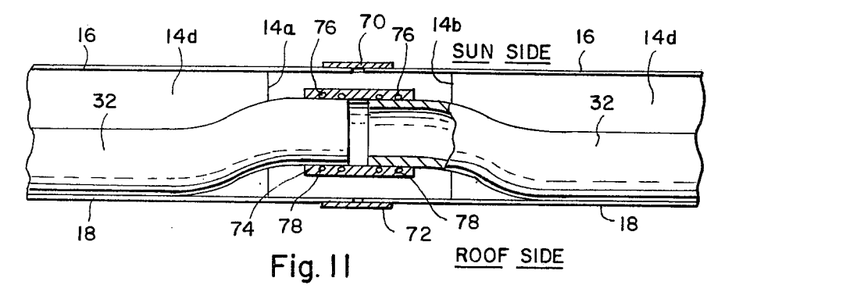
FIG. 11 is a fragmentary sectional drawn on an enlarged scale showing that portion indicated as 11 in FIG. 10 to reveal the structure of the O-ring coupling.
Figure 12:
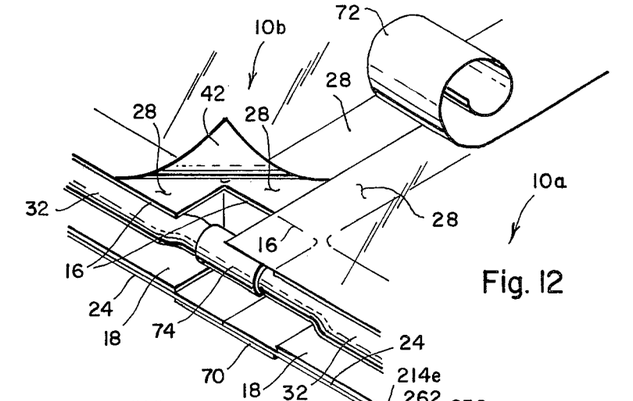
FIG. 12 is a fragmentary perspective view drawn on an enlarged scale showing that portion indicated as 11 in FIG. 10, parts are peeled back for clarity to reveal the construction of a typical joint between adjacent panels.

Depending on the capacity of the system to which it is attached, it might be desirable to "gang" or provide for an array or ensemble of solar collectors. Turning now to FIGS. 10, 11, and 12, there is shown an assembly of such panels, ganged, for added capacity by means of appropriate fluid couplings. The ensemble comprises a plurality of panels or collectors 10a, 10b, 10c, 10d, and 10e each constructed, more or less, identical to collector 10 described with reference to FIGS. 1 through 9. However, to facilitate the installation or possible repair, certain additions are included in the embodiment of FIGS. 10, 11 and 12. A thin film plastic hinge strip 70 is bonded to a narrow strip along the planar outboard face presented by adjacent frame members 14a and 14b of respective contiguous panels. As seen in FIG. 10, hinge strips 70 are applied along alternate "upper" and "lower" co-planar edge-faces thus hinging alternate surfaces of the panels. Hence, in one instance, alternate adjacent "bottom side" absorber edges overlying respective flats 18 of opposed members 14a and 14b are bonded by hinge strips 70, while in another instance, alternate adjacent "top side" glazing edges overlying respective flats 16 of opposed members 14a and 14b are bonded by a hinge 70. In practice hinge 70 is merely an elongate piece of thin film of the type used in, for example, glazing 42, and, by means of the aforesaid alternate disposition of the hinges, the panels are able to fold accordion-like for installation, and can extend planar-like in operation.

At the site of installation, and preparatory to operation and use, the panels are positioned and locked in planar array in accordance with the following construction. Those alternate "top-side" and "bottom side" planar edges of adjacent panels which were not joined by a hinge strip 70, are now joined by a thin film "hinge" strip 72. Hinge piece 72 is complementary in size and composition to hinge 70, and it is adhesively bonded to a narrow strip along the outboard surface of adjacent flat-pairs 16 and flat-pairs 18 of respective opposed frame members 14a and 14b, in a manner similar to that described for hinge piece 70.

An O-ring coupling comprised of a tubular or cylindrical coupling member 74, and a plurality of internally carried parallel space O-rings 76, provide for the facilitated liquid-tight interconnection of adjacent manifolds when the panel assembly is disposed in its planar operative disposition. A plurality of spaced O-ring seats 78 are formed within coupling member 74, as shown. The inside diameter or cross-sectional area of member 74 is complementary in size to the outside diameter or perimetric configuration of a corresponding section of pipe 30 or 32 about which it respectively engages. O-rings 76 are likewise sized complementary to the outside perimetric configuration of manifolds 32 and 32. The O-rings are caused to engage tightly the corresponding peripheries of associated manifolds, due to the appropriate dimensionality of O-ring seats 78. Owing to the complementary internal shape of a given coupling in relation to its respective pipe section, the couplings merely slip-on to respective adjacent manifolds, and thus require a minimal amount of labor. The frictional O-ring sealing afforded by couplings 74 readily accomodates the thermal flexing and relative movement of one panel and manifolding relative to another.

Operation and use of the embodiment shown in FIGS. 10, 11, and 12 is substantially similar to that described with reference to the embodiment of FIGS. 1 through 9, and so it need not be discussed in detail here. Suffice it to say, however, that the water or heat transfer fluid that flows into ganged input manifolds 30 is distributed among all panels to be heated respectively therein, eventually to be collected in gaged outlet manifolds 32 for distribution. The confronting U-channels of adjacently placed frames in the array defines a dead air-space between panels that adds to the overall thermal efficiency of the ensemble.

Figure 13:
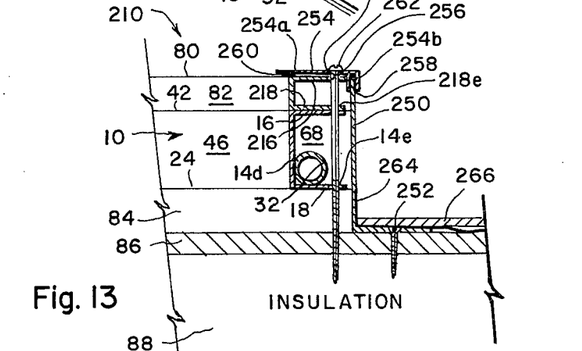
FIG. 13 is a fragmentary sectional view drawn on an enlarged scale showing another embodiment of a collector according to the present invention and the manner of mounting same to a roof.
Figure 14:
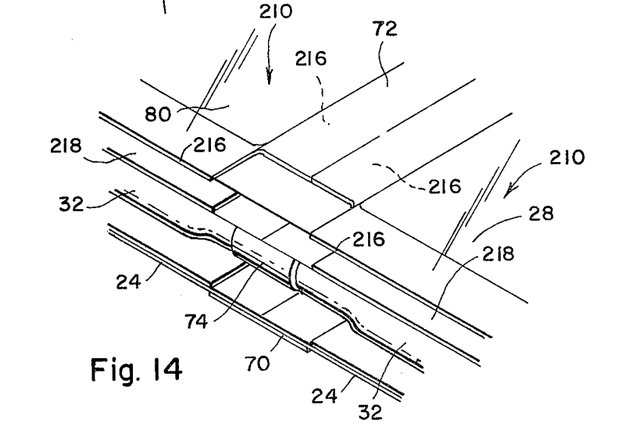
FIG. 14 is a fragmentary perspective view drawn on an enlarged scale showing a typical joint between adjacent panels, the panels are of the construction shown in FIG. 13.

Turning now to FIGS. 13 and 14 there is shown one more embodiment of a solar collector according to the present invention employing a double-glazed or double window construction for added efficiency. In FIGS. 13 and 14, the double-glazed collector is indicated generally by reference numeral 210 and, as is readily apparent when comparison is made of the last mentioned figures to FIGS. 1 through 9, a second thin film window or glazing 80 is added to collector 10. More particularly, a rigid perimetric planar frame 214, complementary in size to frame 14 is, as is frame 14, comprised of rigid members that are, in transverse cross-section, preferably U-channeled or U-shaped. Thus, the respective frame members, one of which, 214d, is shown in cross-section in FIG. 13, are defined by spaced parallel perimetric flats 216 and 218. Glazing or window 80, similar to glazing 42, is stretched across and bonded to the outboard perimetric planar face presented by flats 216. The outboard planar perimetric face presented by flats 218 is then bonded to the upper planar perimetric face presented by glazing 42 and flats 16 thereby orienting window 80 spaced from and parallel opposed to window 42. The two coplanar windows thus define a dead air space 82 between them. It will be apparent when viewing FIGS. 13 and 14 that the members of frame 214 are in dimensional correspondence with the respective members of frame 14. The width of the U-channel of frame 214, or the distance between flats 216 and 218 is not of critical importance. However, depending on such factors as the transmissibility of windows 80 and 42, the ambient temperature, and the heat transfer characteristics of frames 14 and 214, the distance between windows 80 and 42 will effect performance and should be chosen to minimize convective loses. Depending on the size of the U-channel comprising frame members 14, and this is discussed below, a good choice for the height of the U-channel of each member of frame 214 is approximately 1 cm. Hence, windows 80 and 42 are likewise separated by a distance of approximately 1 cm.

In operation and use of collector 210, discussed below, the collector is mounted typically on a roof according to the following construction. A rigid or semi-rigid insulating material such as polymer foams, foam, or the like is sized complementary to the planar face presented by frame 214 and placed on roof 86. An L-bracket 250, similar in construction to L-bracket 50 of FIG. 9, is fastened to surface 86 by means of fastening members 252. A support bracket 254, is, on one end, defined by a planar land 254a, and on the other end, defined by a mini U-channel 254a, as shown. Sort seal strips 258 and 260 are disposed as shown. Bracket 250 is then placed over flat 216 such that mini U-channel 254b engages the upwardly extending seal-covered planar edge of L-bracket 250, while at the same time causing planar land 254a to engage seal 258. An elongate fastening element 262 concomitantly is recovered through apertures 256 of bracket 254, apertures 214e of flats 216 and 218, and apertures 14e of flats 16 and 18, eventually to be received in roof 86. As fastening member 262 is tightened into roof 86, it compressively loads seals 258 and 260 effecting a tight seal about the open ends of frame members 14d and 214d, as well as securing frames 14 and 214 to the roof. A layer of flashing 264 can be applied to and thus butt up against the outboard surface of L-bracket 250. Shingles 266 can then be applied as shown.

Operation and use of collector 210 is generally similar to that described with reference to collector 10 of FIGS. 1 through 9. It will be apparent, however, that the air in space 82 is heated, as is the air in space 46. The heading of both air spaces 82 and 46 adds the overall efficiency of the collector, and thus the double-glazed construction of collector 210 adds to the temperture rise of the fluid flowing through absorber 24 when compared to a single-glazed construction.

FIG. 14 shows the double-glazed collector of FIG. 13 being ganged for added capacity by using substantially the same techniques shown in FIGS. 10, 11 and 12, and so it need not be discussed in detail here. However, it will be apparent that the double-glazed construction of collector 210 requires that respective thin film hings 70 and 72 bond alternate perimetric co-planar edge-pairs presented by adjacent absorber perimeters, or glazing perimeters, as the case may be.

Operation and use of the embodiment of FIG. 14 is substantially similar to the manner of operation described with reference to FIG. 13, the major difference being that the resultant capacity is increased. Respective manifolds 30 and 32 are in fluid communication by means of fluid tight couplings 74, described above.

Figure 15:
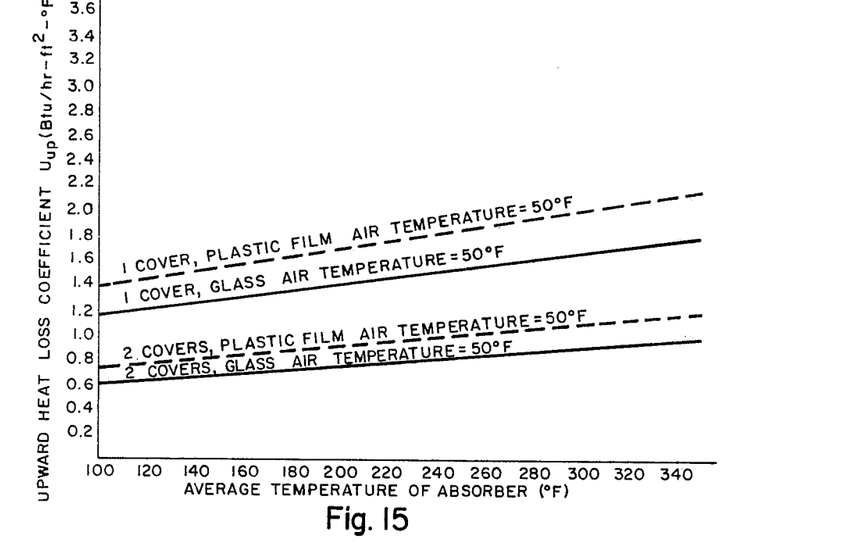
FIG. 15 is a graph representing the heat loss through the upper surface vs. ambient temperature for various types of collectors plotted both as $BTU \cdot ft^{-2} \cdot °F.^{-1}$ vs. °F. and $W.m^{-2} \cdot °C.^{-1}$ vs. °C.

Generally, and in terms of a more theoretical analysis, the expression for useful heat output ($q_u$) from a solar flat plate collector is given by:

$$q_u = F''F'[\tau \alpha I - U_L(ti\text{-}ta)]$$

where ($U_L$) is the heat loss coefficient between the absorber plate and ambient and ti=the abosrber temperature and ta=ambient temperature. This coefficient results from the sum of the heat losses through the transparent cover, edges, and back of the collector. It is generally accepted that the edge and back losses can be controlled by insulation to a level corresponding to 10% of the upper cover losses.

$$U_L = U_{up} + (0.1)U_{up} = 1.1 \cdot U_{up}$$

where ($U_{up}$) may be extracted from FIG. 15 for a one cover thin film plastic glazing and a collector average temperature of 140° F. (60° C.). These values for the upper heat loss coefficient ($U_{up}$) for plastic films were estimated from a conservative 20% greater upper heat loss due to the enhanced transmissivity of plastic films in the infrared region of the electromagnetic spectrum. For this estimation it is possible to derive a value for ($U_L$) of:

$$U_L = 1.1 \ U_{up} = 1.1(1.5) = 1.65 \ \text{Btu/hr-ft}^2\text{-°F.} \left(9.39 \frac{w}{m^2} = c\right)$$

The transmissivity ($\tau$) of many plastic films is good and measured values as high as 0.95 have been verified. Typical values closer to 0.90 may be more realistic and will be used here. With black films, absorbtivity ($\alpha$) is also high with a realistic value of 0.95 as reasonable. The efficiency factor (F') and the flow factor (F'') will be high due to the large ratio of fluid channel flow area to heat exchange area. For this reason it is not unrealistic to expect (F') to have a value of 0.95 and (F'') to have a value of 0.90.

Figure 16:
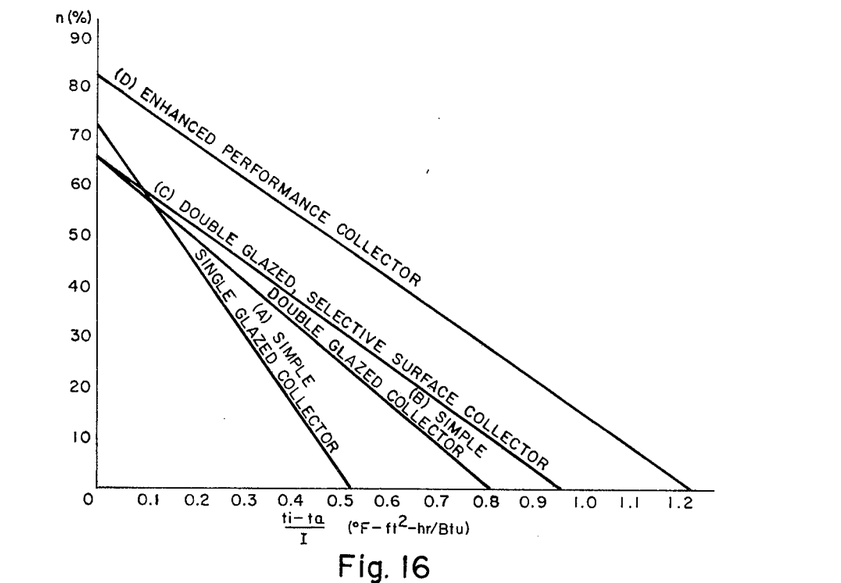
FIG. 16 is a plot of the efficiency of various collectors vs. the ratio of the difference in ambient and absorber temperatures ($\Delta T$) to the isolation (I), i.e. the "load lines" for the various collectors.

To determine the load line performance (i.e., efficiency as a linear function of ti-ta/I) for various collector configurations, it is necessary to find the Cartinean intercepts as shown in FIG. 16. The collector value of "X" intercept ($\Delta T/I$ where $\Delta T = ti - ta$ and I=the insolation) is derived when the heat losses equal the solar heat gain or when:

$$q_u = F'F[\tau \alpha I - U_L(ti - ta)] = 0 \text{ (single film glazing)}$$

or $$\tau \alpha I = U_L(ti - ta)$$

$$\frac{ti - ta}{I} = \frac{ta}{U_L} =$$

$$\frac{(0.90)(0.95)}{1.65} = 0.52° \ \text{F.-ft}^2\text{-hr/Btu} \left(.0911 \frac{m^2 \, °C}{w}\right)$$

The maximum efficiency $n_{max}$ of the "Y" intercept occurs for conditions where ($\Delta T/I$)=0

$$n_{max} = F'F\tau\alpha = (0.90)(0.95)(0.90)(0.95) = 0.73$$

The load line for this simple collector is shown in FIG. 16 line A. The expected stagnation temperature for this collector may be estimated for the extreme condition when the ambient temperature is 100° F.

(37.8°6) and the solar intensity is 300 Btu/hr ft² (947 w/m²). The stagnation temperature would be:

$$ti_s = I(\Delta t/I)_{\eta=0} + ta = 300(0.52) + 100 = 256° \text{ F.}$$
$$(947)(.0911) + 37.8 = 124° \text{ C.}$$

If we consider a plastic collector with two glazing films and the same insulation factor we have:

$$\tau_1 \tau_2 \alpha I = U_{L(ti-ta)}$$

$$\frac{\Delta t}{I} = \frac{\tau_1 \tau_2 \alpha}{U_L} = \frac{(0.90)(0.95)(0.95)}{(0.8) = (0.15)} = 0.81° \text{ F.} = \text{ft}^2\text{-hr/Btu } .142° \text{ C. } m^2/W$$

and $$\eta = F''F\tau_1\tau_2\alpha = (0.90)(0.95)(0.90)(0.90)(0.95) = 0.66$$

The stagnation temperature:

$$ti_s = 300(0.81) = 100 = 343° \text{ F.}$$
$$947(.142) = 37.8 = 173° \text{ C.}$$

The line B in Graph II.

For the same collector as above, but with a selective surface, we may use a value for $U_{up}$ equal to two glass covers since the emissivity of the absorber will be quite low (0.2) and the transmission losses of the plastic in the infrared will not be as serious. (By selective surface herein is meant a surface which has high absorbtivity in the visible spectrum, and low emissivity in the infrared spectrum.) We may therefore predict:

$$\frac{\Delta t}{I_{\eta=0}} = \frac{\tau_1 \tau_2 \alpha}{U_L} = \frac{(0.95)(0.95)(0.98)}{(1.1)(0.66)} = 1.22° \text{ F. -ft}^2\text{-hr/Btu } .2145 m^2 \text{ C/W}$$

and $$\eta = F''F\tau_1\tau_2\alpha = (0.95)(0.98)(0.95)(0.95)(0.98) = 0.82$$

Figures 2, 4:
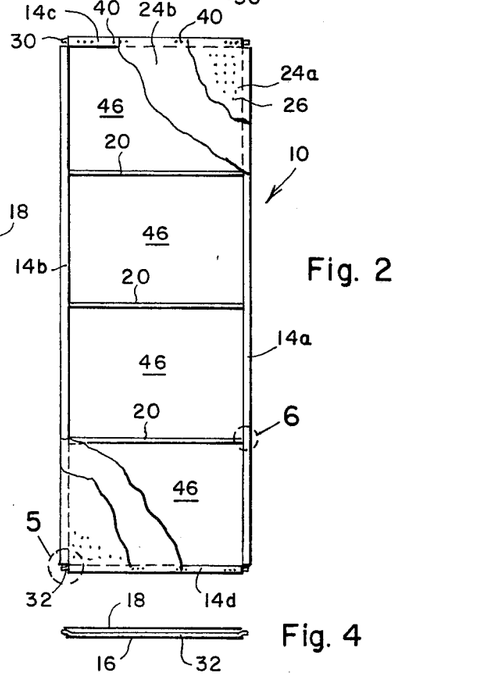
FIG. 2 is a plan view of the solar collector shown in FIG. 1 with portions broken away for clarity.
FIG. 4 is a front elevational view of the structure shown in FIG. 2.
Figure 3:
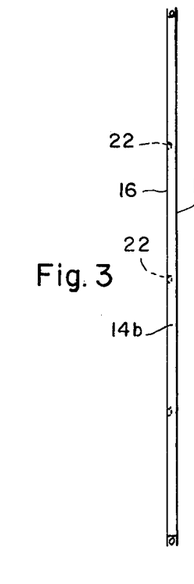
FIG. 3 is a side elevational view of the structure shown in FIG. 2.

See FIG. 2, line D.
The stagnation temperature would be:

$$ti_s = 300(1.22) + 100 = 466° \text{ F.}$$
$$947(.2145) + 37.8 = 241° \text{ C.}$$

The development of a stagnation control mechanism built into the plastic which responds to temperature will allow thin film plastic collectors to compete with, and demonstrate economic advantage over, existing and future fossil-fueled heat-augmented systems. Thus, the control of the stagnation temperature by either the temporary alternation of the transmissivity in the plastic glazing, or the absorbtivity of the absorber, or both, could have a profound affect on the economics of solar applications.

In the embodiments discussed above, the material comprising windows 42 and 80 is described as a thin film. The invention is not to be limited to thin films because glass or sheet plastic can be used. Important parameters to consider in selecting material for windows 42 and 80 are good optical transmission, high strength, low cost, good weatherability, and chemical compatibility with most adhesives. Further, while absorber 24, or more precisely layers 24a and 24b comprising absorber 24 are, preferably, of pliable thin film construction, the invention is not to be limited to thin film absorbers because thin, rigid sheet stock can be used for absorber 24. Important parameters to consider in selecting material for absorber 24 are, generally, good absorbtivity of solar radiation, strength, low cost and good weatherability.

The advanced, thin film structure of the inventive collector suggests operational modes in addition to heat generation. For example, it appears feasible to carry forward the thin film structure of the present invention to adaptation and application with photovoltaic layer. Suitable substrates may be incorporated with the plastic films for deposition or "printing" of the proper photoelectric amorphous semiconductor material. The appropriate electrical connection may be integrated into conductive layers on the plastic support film and semiconductor. Such composition applied to the absorber could result in a simple solar collector structure capable of generating both thermal and electrical energy. Photovoltaic layer may also be included in the glazing film layer as well.

In practice, good results are obtained when complementary frame elements 14a and 14b are approximately 7.5 feet (2.3 m) long, complementary frame elements 14c and 14d are approximately 2.75 feet (0.84 m) long, and the U-channel stock comprising these elements is approximately 1 ⅜ inches (3.5 cm) wide, or, stating this last mentioned dimension another way, surface 16 and surface 18 are separated by a distance of approximately 1 ⅜ inches (3.5 cm). This construction provides for a nominal flow-rate of approximately ½ gallons (1.91) per minute, and yields an envelope pressure of less than 1/10 psi.

While only a few embodiments of the present invention have been shown and described, it is to be understood that many changes and modifications can be made hereto without departing from the spirit and scope hereof.

HYPOTHETICAL EXAMPLE I

A low cost, relatively low performance collector, suitable for use with a solar assisted heat pump, may be made essentially as illustrated in FIG. 1 using the following materials.

Layers 24a and 24b are formed by 0.001" polyester film bonded to 0.002" of aluminum and coated so as to have an absorbtivity, $\alpha$, of approximately 0.95.

Glazing 42 is formed of ultra-violet stabilized polyester having a transmissivity, $\tau$, of approximately 0.86.

Insulation having an R value of approximately 5 is provided to reduce heat loss from the collector.

The collector would operate in a "trickle" mode and absorber 24 would require minimal or no bonding between layers.

It is estimated that such a collector would have the following characteristics:

$$ti_s \approx 250° \text{ F.}$$

$$(\Delta T/I)\eta = o \approx 0.5$$

$$(p_{max}) = 0.72$$

HYPOTHETICAL EXAMPLE II

A moderately higher cost, high performance collector, suitable for direct heating, may be made essentially as illustrated in FIG. 13 using the following materials.

Absorber 24 is formed from two layers of 0.001" polyeterafluoroethylene bonded to 0.002" of aluminum coated so as to have an absorbtivity, α, of 0.95.

First glazing 80 is formed from a 0.003" film of oriented polyvinylidene fluoride (and preferably from the material sold under the Trademark "Kynar"), and has a transmissivity, τ, of approximately 0.93.

Second glazing 42 is formed from a film of 0.001" polytetrafluoroethylene (and preferably from the material sold under the Trademark "teflon FEP") and has a transmissivity of aproximately 0.96.

Insulation having an R value of approximately 5 is provided to reduce heat loss from the collector.

The collector would operate in a "trickle" mode and absorber 24 would require minimal or no bonding between layers.

It is estimated that such a collector would have the following characteristics :

$ti_s \approx 350°$ F.

$(\Delta T/I)\eta = o \approx 0.85$ $(\eta_{max}) \approx 0.76$

What is claimed is:

1. A solar collector comprising:
   (a) a perimetric frame defining a substantially open central portion having two spaced, substantially planar sides;
   (b) glazing, substantially congruent to said frame, covering one of said sides and fastened to said frame; and,
   (c) a thin film absorber, substantially congruent to said frame, covering the other of said sides and tautly bonded around the edges to said frame, whereby said frame and said absorber cooperate to form a light-weight, high-strength monocoque structure, said absorber further comprising two substantially congruent thin films bonded together around their edges to form an envelope having a high surface area to volume ratio and openings for introducing and removing a heat transfer fluid to and from said envelope; and
   (d) manifold means for providing a flow of heat transfer fluid through said absorber.

2. A solar collector as described in claim 1, wherein said glazing comprises a thin plastic film tautly bonded around the edges to said frame, whereby said frame, absorber, and glazing cooperate to form a light-weight, high-strength, monocoque structure.

3. A solar collector as described in claim 1 or 2, wherein said films comprising said absorber are further bonded together at a plurality of locations across their surface so as to maintan a high degree of parallelism between said films as said heat transfer fluid flows through said envelope, thereby assuring that a substantial portion of the surface of said films is wetted.

4. A solar collector as described in claim 3, wherein said films are formed from a high-strength plastic resistant to temperatures in excess of 200° F.

5. A solar collector as described in claims 1 or 2, wherein said films comprising said absorber are formed from a metal/plastic laminate.

6. A solar collector as described in claim 5, wherein said metal is aluminum.

7. A solar collector as described in claims 1 or 2, wherein said frame comprises members, each of which has a transverse cross-section that is substantially U-shaped, the U-shape opening outwards from the interior of said frame, so that a channel is formed around the outside edge of said frame.

8. A solar collector as described in claim 7, wherein manifold means for providing a flow of heat transfer fluid through said absorber are disposed within channels.

9. An ensemble of solar collectors, wherein said solar collector is of the type described in claim 8, said collectors being interconnected by hinge means for allowing said ensemble to fold accordian-like into a compact configuration for storage and transportation and to open into a planar array of said collectors for installation and use.

* * * * *